United States Patent
Verley

[15] 3,650,540
[45] Mar. 21, 1972

[54] VEHICLE SUSPENSION SYSTEM

[72] Inventor: Donald J. Verley, 444 Sunnycrest Drive, Los Angeles, Calif. 90068

[22] Filed: Feb. 6, 1970

[21] Appl. No.: 9,193

[52] U.S. Cl............................................280/124 B, 267/57
[51] Int. Cl.......................................................B60g 11/18
[58] Field of Search....................................280/124.3; 267/57

[56] References Cited

UNITED STATES PATENTS 2,741,493  4/1956  Matthias............................280/124 B

*Primary Examiner*—Philip Goodman
*Attorney*—Robert Louis Finkel

[57] ABSTRACT

A wheel suspension system for vehicles, particularly relatively light-weight low-speed vehicles such as golf carts, industrial utility vehicles, and the like. The suspension system includes a suspension arm for each wheel extending longitudinally of and pivotally mounted at one end on the vehicle frame for vertical swinging movement of the wheel and arm about a transverse axis of the frame, and a spring for yieldably resisting upward and downward rotation of the arm relative to the frame. A primary feature of the invention resides in a restraining device which acts between the frame and each wheel suspension arm to yieldably resist, cushion, and damp deflection of the arm laterally of the frame during cornering and under other driving conditions that impose a lateral deflection load on the arm. In the disclosed inventive embodiment, each wheel suspension arm is furnished by a one-piece metal rod whose ends are bent laterally to form a wheel support and a torsion spring bar on the arm.

9 Claims, 3 Drawing Figures

Patented March 21, 1972 3,650,540
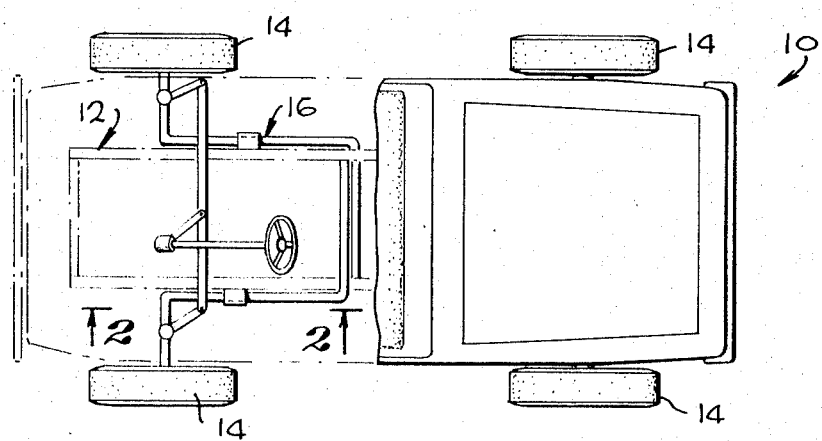
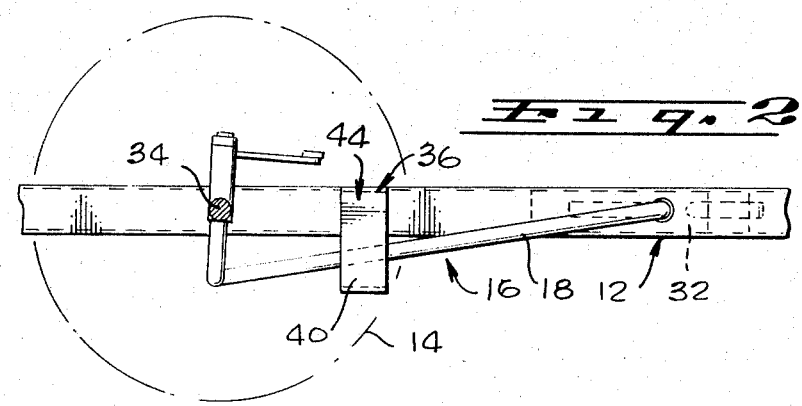
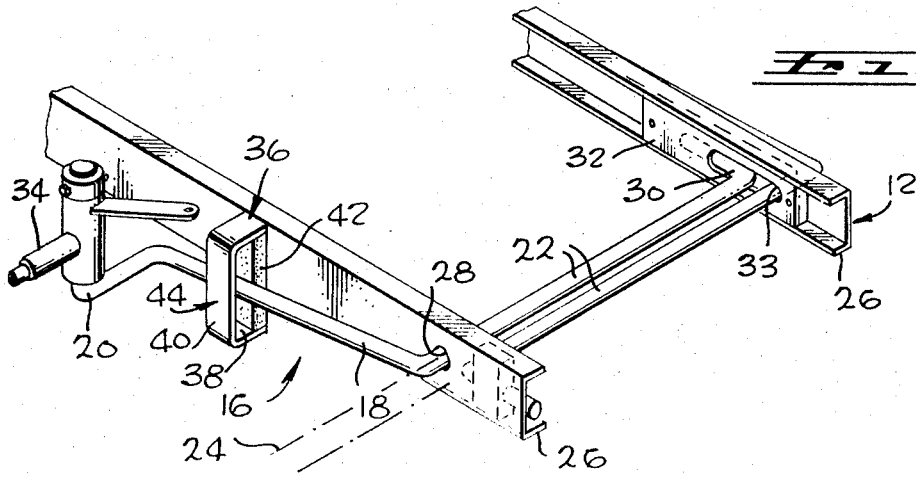
INVENTOR.
DONALD J. VERLEY
BY
ATTORNEY 3,650,540

VEHICLE SUSPENSION SYSTEM

BACKGROUND OF THE INVENTION

1. Field of the Invention

This invention relates generally to vehicles and more particularly to a simple, low-cost wheel suspension system for vehicles, particularly relatively lightweight low speed vehicles such as golf carts, industrial utility vehicles, and the like.

2. Prior Art

All wheeled vehicles are generally characterized by a frame, ground wheels, and a wheel suspension system for mounting the frame on the wheels. The suspension systems of heavy high-speed vehicles, such as passenger cars, trucks, and the like, are relatively complex, costly, and otherwise ill-suited to use on relatively lightweight, low speed, low-cost vehicles of the class referred to above. The present invention provides a simple low-cost wheel suspension system which is ideally suited for this latter class of vehicles. However, it will become readily evident as the description proceeds that the invention is not necessarily limited in application to such vehicles.

SUMMARY OF THE INVENTION

The present wheel suspension system is equipped with a suspension arm for each wheel extending longitudinally of the vehicle frame. At one end of this arm are wheel mounting means. At the opposite end of the arm are means for pivotally mounting the arm on the vehicle frame on a transverse pivot axis of the arm and frame. A spring is provided which yieldably resists upward rotation of the arm relative to the frame to provide a spring action.

During cornering, and under various other driving conditions, each wheel suspension arm is subjected to a a lateral load which tends to deflect the arm laterally relative to the vehicle frame. A primary feature of this invention is concerned with resisting, cushioning, and damping this deflection. To this end, the present wheel suspension system is equipped with restraining means which act between the frame and each suspension arm to yieldably resist, cushion, and damp such lateral arm deflection while permitting vertical swinging of the arm. In the presently disclosed inventive embodiment, the restraining means for each suspension arm comprises a guide having a vertical guideway in which the arm moves during its vertical swinging movement relative to the frame. The guideway is bounded by vertical side wall members which laterally engage the arm to resist its deflection. At least one of these wall members is resiliently yieldable under the thrust of the laterally deflecting suspension arm to resist deflection with a resilient cushioning and damping action. Each suspension arm of the disclosed vehicle suspension system is furnished by a one-piece metal rod having one end bent laterally to form a wheel support and its opposite end bent laterally to form a combined torsion spring bar and pivot journal for the arm.

BRIEF DESCRIPTION OF THE DRAWINGS

FIG. 1 is a plan view of a utility vehicle equipped with a wheel suspension system according to the invention;

FIG. 2 is an enlarged section taken on line 2—2 in FIG. 1; and

FIG. 3 is an enlarged fragmentary perspective view of the wheel suspension system.

DESCRIPTION OF THE PREFERRED EMBODIMENTS

Turning now to these drawings, there is illustrated a small utility vehicle 10 embodying a frame 12, ground wheels 14, and a front wheel suspension system 16 according to the invention mounting the frame on the front wheels. This wheel suspension system includes a suspension arm 18 for each front wheel. At one end of the arm 18 are means 20 for mounting a wheel on the arm. At the opposite end of the arm are means 22 for pivotally mounting the arm on the vehicle frame 12 on a transverse pivot axis 24 of the arm and frame. Accordingly, the suspension arm 18 is supported on the vehicle frame 12 for swinging movement relative to the frame in a normally vertical longitudinal plane of the frame. A spring is provided to yieldably resist upward rotation of the arm relative to the frame and thereby provide the suspension system with a spring action. In this instance, the arm mounting means 22 is a torsion bar on the pivot axis 24 which serves the dual function of a pivot journal and a torsion spring for the suspension arm 18.

Vehicle frame 12 includes a longitudinal frame members 26 in the form of inwardly opening channels. The torsion bar 22 of each wheel suspension arm 18 extends rotatably through a bore 28 in the adjacent channel and has its free end 30 bent at rights angles and positioned between the flanges of the opposite channel. This bent free end of the torsion bar is attached to the adjacent channel by a clamp bar 32, which also provides a bearing bore 33 for the adjacent end of the torsion bar on the opposite wheel suspension arm 18. Thus, the free end of each torsion bar is firmly anchored to the vehicle frame 12 so that upwardly rotation of its wheel suspension arm 18 torsionally twists and is thereby yieldably resisted by the torsional elasticity of the torsion bar. Each suspension arm 18 and the bent end 30 of its torsion bar 22 are so relatively oriented about the torsion bar axis 24 in the normal unstressed condition of the torsion bar, that under normal loading of the vehicle 10, the vehicle frame 12 and front wheels 14 assume their normal relative vertical positions of FIG. 2.

In the particular embodiment of the invention selected for illustration, the suspension arm 18 for each front wheel is furnished by a one-piece metal rod whose ends are bent laterally to form the wheel support 20 and torsion bar 22, respectively. The wheel support 20 comprises an upturned end of the rod which forms a king pin for rotatably supporting a front wheel spindle 34 on a normally generally vertical turning axis. Each front wheel 14 is mounted on the vehicle frame 12 in the manner explained above. The torsion spring bars 22 for the two front wheels are disposed side by side, one behind the other, in the manner best illustrated in FIG. 3. It will now be understood, therefore, that the front wheels 14 of the vehicle 10 are mounted on the vehicle 12 for independent springing movement. The separate rods which form the wheel supports, suspension arms, and torsion bars for the two front wheels may obviously be simply and economically mass produced.

It should be noted here that while the invention has been described and illustrated in connection with a front wheel suspension system, the wheel suspension system of the invention may be used, as well, for unpowered rear vehicle wheels. In this case, the wheel supporting ends of the suspension arms 18 will merely turn outwardly to form spindles for the rear wheels.

During cornering, and under various other driving conditions, each wheel suspension arm 18 of the present wheel suspension system 16 is subjected to a lateral load which tends to deflect the arm laterally toward or away from the vehicle frame 12, depending upon the direction of the load. A primary feature of the invention is concerned with resisting, cushioning, and damping this deflection. To this end, the wheel suspension system 16 is equipped with lateral restraining means 36 for each wheel suspension arm 18. Each restraining means acts between the vehicle frame 12 and the corresponding suspension arm 18 to yieldably resist, cushion, and damp lateral deflection of the arm.

Each illustrated arm restraining means 36 comprises a guide containing a vertical guideway 38 receiving a central portion of the corresponding suspension arm 18 and in which the arm moves vertically during vertical swinging movement of the arm on its pivot axis 24. The guideway is bounded by vertical side wall members 40, 42 which are laterally engageable with the suspension arm to resist its deflection. The resilient deflection-cushioning and damping action of each arm restraining means 36 may be accomplished in various ways. For example, each arm restraining guide might be mounted on the vehicle frame 12 for bodily movement laterally of the frame. In this case, springs would be provided for yieldably resisting, cushioning, and damping bodily movement of the guide relative to the frame and, thereby, lateral deflection of the corresponding suspension arm 18.

In the particular inventive embodiment illustrated, on the other hand, each suspension arm restraining guide includes a rigid body 44 of open rectangular shape which is welded, bolted, or otherwise rigidly joined to the outer side of the adjacent vehicle frame channel 26. The outer vertical side of this guide body provides the outer guideway wall member 40. The inner guideway wall member 42 is furnished by a resilient block of rubber or plastic fixed between the upper and lower sides of the guide body 44 in seating contact with the inner vertical side of the body. Accordingly, the illustrated restraining means yieldably resist, cushion, and damp only inward deflection of the wheel suspension arms 18. Outward deflection of these arms is positively limited by the outer wall members 40. If desired, suspension arm deflection may be yieldably resisted, cushioned and damped in the outward direction, as well by placing resilient blocks against the inner surfaces of the outer wall members 40.

It will be immediately evident to those versed in the art that the resilient cushioning action of the suspension arm restraining means 36 may be accomplished in yet other ways. For example, the resilient blocks of the illustrated arm restraining means may be replaced by spring loaded plates, metal springs, or other types of resilient elements.

What is claimed is:

1. Wheel suspension means for a vehicle having a frame comprising:
   a wheel suspension arm extending generally longitudinally of said frame,
   wheel mounting means at one end of said arm for rotatably mounting a wheel on said arm end on a transverse rotation axis of the arm,
   arm mounting means at the other end of said arm for pivotally mounting said other arm end on said frame on a transverse pivot axis of said arm and frame, whereby said arm is rotatable in a normally vertical longitudinal plane of said frame and said arm is subjected to lateral loads during cornering and under various other driving conditions in a manner which tends to deflect said arm laterally of said frame, and
   restraining means attached to said frame and operatively engaging said arm between its ends for yieldably resisting, cushioning, and damping lateral deflection of said arm while permitting vertical swinging movement of said arm on said pivot axis.

2. Wheel suspension means according to claim 1 wherein:
   said restraining means comprises a guide having a normally vertical guideway receiving said arm for vertical movement of the arm in said guideway during rotational movement of the arm on said pivot axis, and said guideway is bounded by confronting vertical wall members which are laterally engageable with said arm to resist lateral deflection of said arm.

3. Wheel suspension means according to claim 2, wherein:
   one wall member is resiliently yieldable in the lateral direction of said guideway.

4. Wheel suspension means according to claim 3, wherein:
   said guide comprises a rigid body mounted on said frame, and
   said yieldable wall member is carried by said body.

5. Wheel suspension means for a vehicle having a frame, comprising:
   a one-piece metal rod having a laterally turned end forming a wheel support, an opposite laterally turned end forming a torsion spring bar, and an intermediate central portion forming a wheel suspension arm,
   said torsion bar being adapted to be rotatably supported on said frame with the longitudinal axis of the bar extending crosswise of the frame and to be anchored to said frame at a position spaced along said bar from said arm for yieldable swinging movement of said arm in a normally vertical longitudinal place of said frame, whereby said arm is subjected to lateral loads during cornering and under various other driving conditions in a manner which tends to deflect said arm laterally of said frame, and
   restraining means attached to said frame and operatively engaging said suspension arm between its ends for yieldably resisting, cushioning, and damping lateral deflection of said arm while permitting swinging movement of said arm on said torsion bar axis.

6. Wheel suspension means according to claim 5 wherein:
   said restraining means comprises a guide having a normally vertical guideway receiving said arm for vertical movement of the arm in said guideway during rotational movement of the arm on said torsion bar axis, and said guideway is bounded by confronting vertical side wall members which are laterally engageable with said arm to resist lateral deflection of the arm.

7. Wheel suspension means according to claim 6, wherein:
   said guide comprises a rigid body attached to said frame, and
   one of said guideway wall members is resiliently yieldable laterally of said guideway and carried by said body.

8. In a vehicle, the combination comprising:
   a frame,
   a wheel suspension arm extending generally longitudinally of said frame,
   a ground wheel mounted on one end of said arm on a transverse rotation axis of the arm,
   means pivotally mounting the other end of said arm on said frame on a transverse pivot axis of the arm and frame, said means including a torsion bar on said pivot axis rigidly joined to said other arm end, anchored to said frame at a position spaced along said bar from said arm and rotatably supported adjacent said arm on said frame, whereby said arm is rotatable in a normally vertical longitudinal plane of said frame and said arm is subjected to lateral loads during cornering and under other driving conditions in a manner which tends to deflect said arm laterally of said frame and said upward and downward rotation of said arm relative to said frame is yieldably resisted, and
   restraining means comprising a guide mounted on said frame and having a normally generally vertical guideway receiving said arm between its ends, whereby said arm is vertically moveable in said guideway during vertical swinging movement of said arm on said pivot axis, and confronting vertical wall members bounding the vertical sides of said guideway which are engageable laterally with said arm to resist lateral deflection thereof.

9. The vehicle combination according to claim 8, wherein:
   one wall member of said guide is resiliently yieldable laterally of said guideway.

* * * * *